United States Patent [19]
Suhami et al.

[11] 3,854,047
[45] Dec. 10, 1974

[54] DETECTOR HAVING A PLURALITY OF PAIRS OF PHOTO-DETECTORS FOR DETERMINING THE COORDINATES OF A LIGHT EVENT IN A SCINTILLATOR CRYSTAL

[75] Inventors: Avraham Suhami; Benjamin Sabbah, both of Haifa, Israel

[73] Assignee: Elscint Ltd., Haifa, Israel

[22] Filed: Sept. 7, 1972

[21] Appl. No.: 286,986

[52] U.S. Cl. .................................. 250/366, 250/369
[51] Int. Cl. ............................................ G01t 1/20
[58] Field of Search .......... 250/71.5 R, 71.5 S, 363, 250/366, 369

[56] References Cited
UNITED STATES PATENTS
3,011,057   11/1961   Anger ................................. 250/366
3,327,116    6/1967   Loveday .......................... 250/71.5 R
3,688,113    8/1972   Miraldi .......................... 250/71.5 S

*Primary Examiner*—Archie R. Borchelt
*Assistant Examiner*—Davis L. Willis
*Attorney, Agent, or Firm*—Browdy and Neimark

[57] ABSTRACT

A detector responsive to incidences of individual radiation stimuli comprises a scintillator crystal defined by a peripheral edge surface whose generatrix is parallel to the central axis of the crystal, and a pair of polished and non-coated parallel faces perpendicular to the axis; and a plurality of photo-detectors each of which has a photo-sensitive surface positioned adjacent to the different segments of the edge surface of the crstal for receiving light emitted by the crystal in response to an event in the crystal caused by a gamma ray. The output of each photo-detector is functionally dependent on the planar coordinates of the event relative to the central axis, but is substantially independent of the axial location of the event in the crystal.

10 Claims, 5 Drawing Figures

3,854,047

DETECTOR HAVING A PLURALITY OF PAIRS OF PHOTO-DETECTORS FOR DETERMINING THE COORDINATES OF A LIGHT EVENT IN A SCINTILLATOR CRYSTAL

This invention relates to a detector responsive to incident radiation stimuli, and to a method and means for using such a detector to determine the planar coordinates of the stimuli.

The accurate location of the planar coordinates of individual radiation stimuli is required in order to map organs of patients injected with radioactive pharmaceuticals. Such maps, which show the quantity of pharmaceuticals present in each elemental portion of an organ, contain significant medical information enabling those skilled in nuclear medicine to study, test and treat the organ. In order to obtain maps of this type, it is conventional to use what is termed, in the nuclear medicine field, a "gamma camera," i.e., a device which can be positioned to receive gamma rays emitted by an organ forming a distributed radiation source, and which provides the planar coordinates of each ray enabling the distribution density of the rays to be mapped.

Conventional gamma ray cameras include a collimator for passing only that radiation stimuli from a patient passing in an axial direction, a scintillation crystal disc providing a target with which most of the radiation stimuli passing the collimator collide producing a pulse of light for each collision (event), a plurality of photo-detectors for receiving the pulses of light, and a circuit responsive to the output of the photo-detectors for computing the planar coordinates of each pulse. Such a gamma camera is shown in U.S. Pat. No. 3,011,057 wherein the photo-detectors are arranged in a cluster axially above and at some distance from the scintillator crystal so that the photo-detectors survey overlapping areas of the crystal.

Light from an event, caused by a Z-directed radiation stimulus entering the crystal and colliding with a target therein, is radiated from the location of the event in all directions, but only a small percentage of the radiated light can be used for establishing the spatial position of the event. The radiated light containing primary position information is contained in an upwardly directed cone whose apex is located at the Z-depth at which the event occurs, and whose base is defined by the plane of the sensitive areas of the cluster of photo-detectors. Not all of the light, however, is usable, because some is incident on the interstices between the photodetectors and is thus wasted. The balance of the light radiated from an event is either totally internally reflected from the coated back face of the crystal and its peripheral edges and is thus not available to the photodetectors, or is reflected one or more times into the photodetectors thereby degrading its ability to convey position information. While the quantity of light available for position detection purposes is thus limited, that which is available will be proportional to the solid angle seen by a photodetector permitting an analysis of the output of the various photodetectors to yield the X-Y spatial coordinates of the event.

In addition to being inefficient in using the available light output from an event, the resolution of a conventional detector (i.e., the ability to distinguish between separate events in the x-y plane) depends on the thickness of the crystal because the area subtended by a cone of light of a given solid angle increases with an increase in the distance of the event from the detectors. In other words, as events occur more remotely from the detectors (i.e., when the crystal is thicker), the resultant cones of light of a given solid angle will subtend more of the detectors thus reducing their ability to distinguish between events.

It is therefore a primary object of the present invention to provide a new and improved detector of the type described which is more efficient than the prior art detectors in using light caused by an event, whose size does not determine its resolution capability, and whose accuracy is substantially independent of the crystal thickness.

According to the present invention, there is provided a detector responsive to incidences of individual radiation stimuli comprising: a scintillator crystal responsive to an event therein caused by radiation stimulus for emitting a light pulse; the crystal being defined by a peripheral edge surface whose generatrix is parallel to the central axis of the crystal, and a pair of parallel polished and noncoated faces perpendicular to the axis; and a plurality of pairs of photo-detectors each of which has a photo-sensitive surface positioned adjacent different segments of the edge surface of the crystal for receiving light emitted by the crystal in response to an event, each photo-detector of a pair being in diametrical alignment whereby the output of each photodetector is functionally dependent on the planar coordinates of the event relative to the central axis but is independent of the axial location of the event in the crystal.

If the two faces of the crystal have an air-crystal interface, almost all of the light produced by an event, by reason of critical angle reflections, will reach the peripheral edges of the crystal where the photo-detectors are located; only the light contained in cones within a narrow solid angle (18° in the case of a crystal of NaI(T1) — air interface) in the upward and downward directions, will pass through the top and bottom faces of the crystal and be unavailable for detection purposes. The Z-location of an event in the crystal has no effect on the ability of the detector to establish the planar coordinates of the event.

An embodiment of the invention is illustrated by way of example in the accompanying drawings, wherein.

Figure 1:
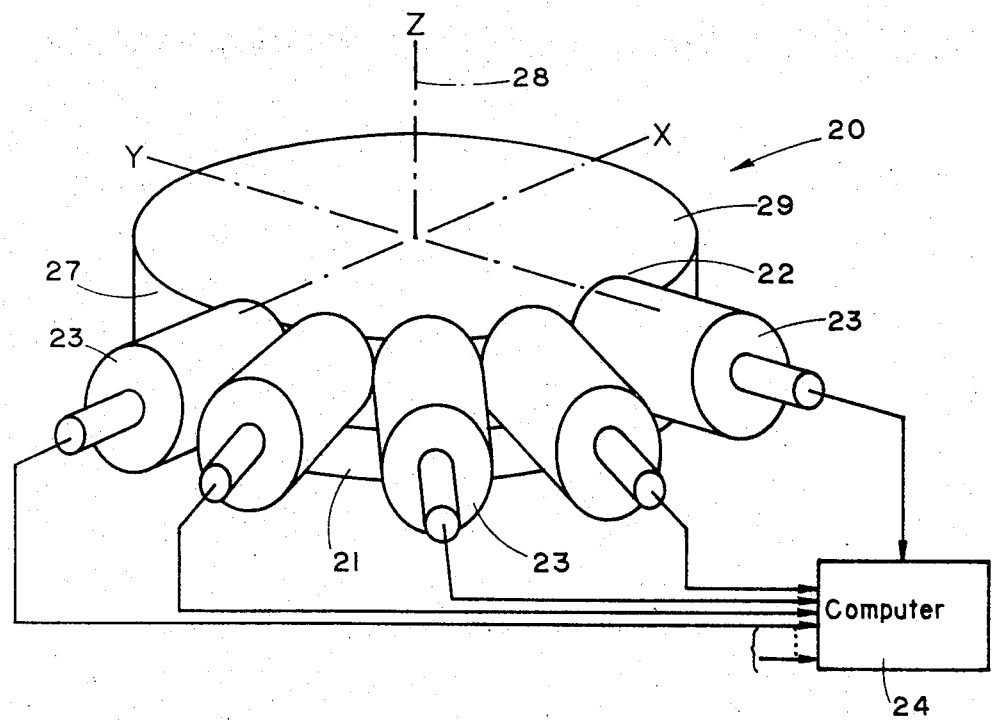
FIG. 1 is a perspective view of a detector in accordance with the present invention.

Referring now to FIG. 1, reference numeral 20 designates a detector according to the present invention comprising a collimator 21, a scintillator crystal 22 and a plurality of photodetectors 23 connected to a computer 24 by which the polar coordinates events in the crystal can be computed from the output of the photodetectors 23.

Collimator 21 is entirely conventional and comprises a metallic honeycomb having a plurality of vertically oriented interconnected walls 25 defining a pattern in the x-y plane that is related to the radioactive isotope that has been injected to the subject 26 under study. Only axially directed radiation stimuli entering between the walls 25 will thus impinge upon the crystal 22 so that a more accurate mapping can be achieved than would be the case were collimator 21 not used.

Crystal 22, which, for example, may be made from thallium-activated sodium iodide, is disc-shaped and is defined by a peripheral edge surface 27 whose generatrix is parallel to the central axis 28 of the crystal and a pair of parallel faces 29 and 30 perpendicular to the axis 28. Faces 29 and 30 are flat, in an optical sense, and well polished without any coating. This arrangement, together with a lack of a reflecting coating, on the faces enables a relatively large, fixed percentage of light emitted in response to the occurrence of an event to be channelled into the peripheral edge surfaces 27 through critical angle reflections.

Photo detectors 23 are conventional in nature, and, for example, may be photo-multiplier tubes. The crystal 22 may be provided with a polygonal shape in the x-y plane to present to each photo-multiplier a contoured face matching the face of the multiplier which can be cemented to the crystal with a transparent epoxy. In such case, the photo multipliers 23 are arrayed in radial spoke-like fashion around the edge 27 of the crystal as shown in FIG. 1. Only three photo-multipliers are shown in FIG. 1 for the purpose of simplifying the drawings, it being understood that sufficient photo multipliers are provided for completely covering the peripheral surface 27. For a 12 inch diamter's scintillator crystal, 16 photo-multipliers, each with a 2 inch diameter face, can be provided. This arrangement is adequate to collect about 75% of the total light containing direct position information. Only about 15% of the light containing direct position information is collected from a 12 inch diameter crystal by 19 photomultipliers in the detector of the type disclosed in the U.S. Pat. No. 3,011,057 providing the detector of the present invention with an almost 5:1 advantage in the collection of light containing direct position information.

Alternative to arranging the photo-multipliers in the spoke-like fashion shown in FIG. 1 and, perhaps contouring the edge 27 of the crystal to accommodate the faces of the photo-multipliers, a fibre optical system can be utilized for conducting light from elemental areas of the surface 27 of the crystal to a bank of photo-multiplier tubes.

Figure 2:
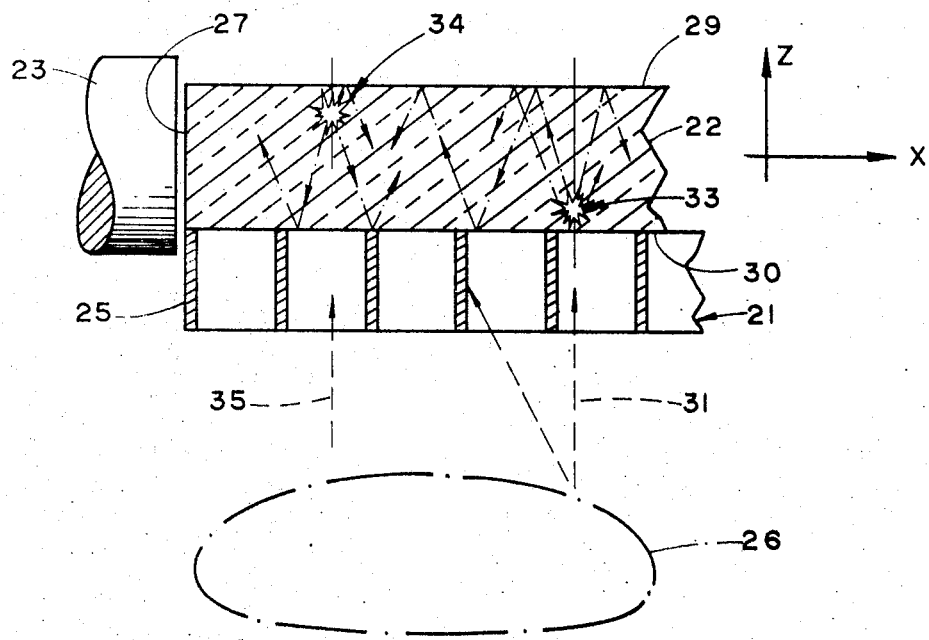
FIG. 2 is a sectional view of the crystal shown in FIG. 1 indicating the relative locations of the photo-detector and the collimator.

As seen in FIG. 2, gamma ray 31 emitted from the subject 26 at a given point in a direction parallel to the z-axis 28 of the crystal passes between walls 25 of the collimator and enters the crystal through face 30 and causes an event 33 in a region of the crystal close to the collimator. Gamma rays emitted from the same point but inclined to the axis 28 will be screened from the crystal by the collimator. The light resulting from event 33 is radiated omnidirectionally. Light contained in a conical region with a given solid angle (18° for example for a NaI(T1) — air interface) and orientated with the apex of the cone at the event and the axis of the cone parallel to the z-axis 28, will escape from the crystal and pass upwardly and downwardly as shown in the drawings. The balance of the light due to event 33, and contained in the remaining solid angle will pass through the crystal by reason of total internal reflections. All of this light will reach the peripheral edge surface 27 and most of it will pass into the various photo-multipliers 23.

The z-location of an event has no effect on the amount of light from the event reaching the photo multiplier. This is illustrated in FIG. 2 by event 34 caused by gamma ray 35 which has travelled almost completely through the crystal from surface 30 towards surface 29 before interacting with a target in the crystal and producing a light pulse.

Another significant advantage of the present invention relates to the case of calibration. Such calibration must be carried out to normalize the response of each photo-multiplier, so that each will have the same electrical output for the same light input. The gain of the photomultipliers can be adjusted easily by applying at the geometric center of the crystal, a light input of a given intensity. With such an input the gain of each photomultiplier can be adjusted to provide the same output without the adjustment to one affecting the setting of another.

Figure 4:
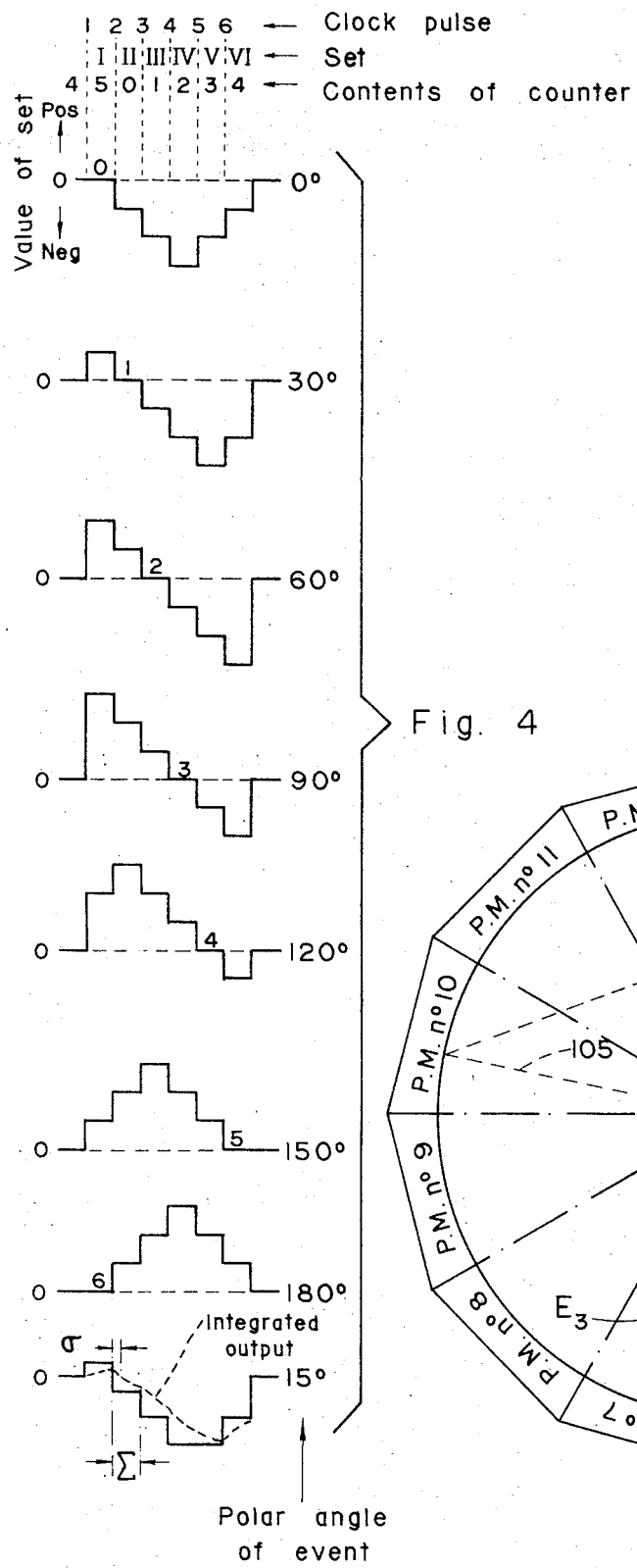
FIG. 4 is a plot showing the variation of the differences between the outputs of pairs of groups of the detectors as a function of the sets with which the pairs of groups are associated.
Figure 3:
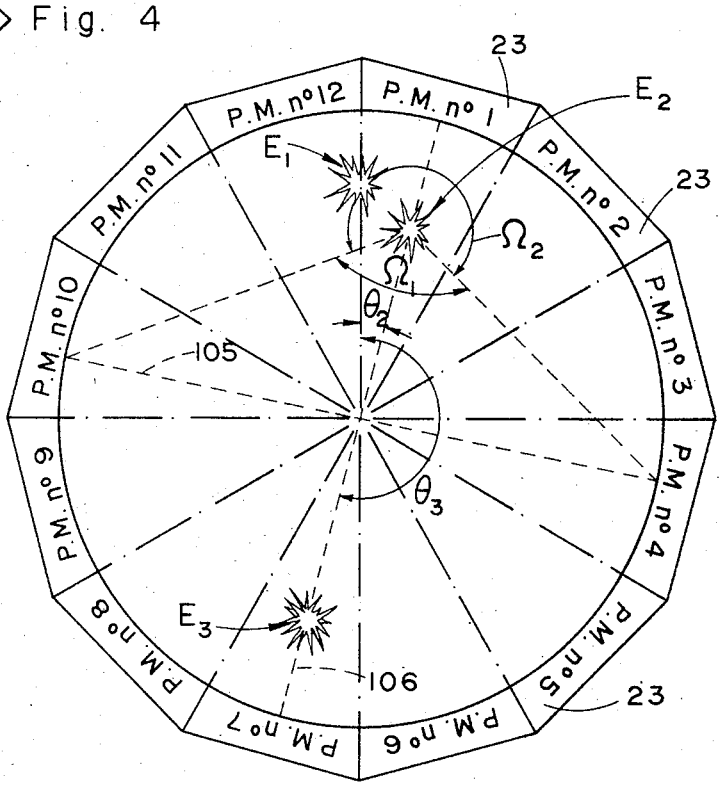
FIG. 3 is a top plan view of a detector according to the present invention shwoing the use of twelve photomultipliers.

The theory behind the operation of computer 24 by which the polar coordinates of a light event are computed, can be understood by making reference to FIGS. 3 and 4. In FIG. 3, twelve photomultipliers 23 are arranged radially around crystal 22, it being understood that this number of photomultipliers has been selected for the purpose of conveniently illustrating the theory of operation, and a large number, say sixteen, would normally be used with a standard 12 inch diameter crystal.

For analysis purposes, consider the photomultipliers to be arranged in sets of ordered pairs of groups of photomultipliers as follows:

|  | Group (a) | Group (b) |
| --- | --- | --- |
| Set I | 1,2,3,4,5,6 | 7,8,9,10,11,12 |
| Set II | 2,3,4,5,6,7 | 8,9,10,11,12,1 |
| Set III | 3,4,5,6,7,8 | 9,10,11,12,1,2 |
| Set IV | 4,5,6,7,8,9 | 10,11,12,1,2,3 |
| Set V | 5,6,7,8,9,10 | 11,12,1,2,3,4 |
| Set VI | 6,7,8,9,10,11 | 12,1,2,3,4,5 |

From inspection of FIG. 3, it can be seen that light from any event in the crystal will be seen by each photomultiplier. Moreover, if an event $E_1$ occurs exactly between photomultipliers 12 and 1, the combined output of the detectors of Group (a) of Set I would exactly equal the combined outputs of the detectors of Group (b) of this set. Defining the "value" of a set as the difference between the sums of the outputs of the detectors of Group (a) and the sums of the outputs of the detectors of Group (b) of the same set, then the value of Set I is zero for event $E_1$. The value of each of the other five sets for event $E_1$ is different from zero, and specifically, is negative. The plot of the top line of FIG. 4 represent the variation of value of the six sets for event $E_1$.

For events occurring exactly between adjacent photomultipliers at polar angles other than 0°, the variation in values of the six sets are shown in the other plots of FIG. 4. Note that one set in each plot has zero value, and that such set specifies the polar angle of the event resulting in the plot. Note also that the plot resulting from an event occurring exactly between photomultipliers 6 and 7 at a polar angle of 180° from event E, will result in a polot that is the mirror-image of the plot resulting from event $E_1$. Thus, the polar angle of an event can be ascertained from two types of information:

1. the identification of the set having zero value; and 2. the sign of the value of the next set following the set having zero value.

For example, if Set III were zero, the polar angle could be either 60° or 240°; but the ambiguity is resolved by ascertaining the sign of the value of Set IV. If the sign of Set IV is negative, this event will have occurred at 60°; while if the sign is positive, the event will have occurred at 240°.

In an actual system, the probability is very small that events will occur precisely between two adjacent detectors; and a typical event is one which occurs within the sector associated with a photo-multiplier. A typical event is thus illustrated by event $E_2$ which occurs at a polar angle of say 15° within the sector of photomultiplier 1. In such case, none of the six sets will have a zero value as indicated by the plot in the last line of FIG. 4, and a process of linear interpolation can be used to ascertain the polar angle of the event. The rational for the interpolation is clear from inspection of the plot in the last line of FIG. 4 which indicates that the sector within which an event occurs is specified by identifying the first of two consecutive sets whose value changes sign; and the location in the sector of the event is specified to a very good approximation by the relationship between the absolute values of these two sets. For example, when the sign of the value of Set I is positive and the sign of the value of Set II is negative, the event will have occurred between a polar angle of 0° and a polar angle of 30°. When the absolute value of Sets I and II are equal, the conclusion is reached that the event causing this situation occurred at 15°.

In the preferred embodiment of the invention, the interpolation is achieved by an analogue process which integrates (i.e., smoothes) the variations in values of the sets permitting the polar angle $\theta$ of an event to be calculated as follows:

$$\theta = \theta_o + (\sigma/\Sigma)(30°)$$

where $\theta_o$ is the polar angle of that set preceeding a set whose value changes sign, $\sigma$ is the zero - crossing time (defined below in detail) and $\Sigma$ is the period of computing the values of the sets. For event $E_2$, $\theta_o = 0°$ and $(\sigma/\Sigma) = 0.5$, with the result that $\theta = 15°$. For event $E_3$, $\theta_o = 180°$ and $(\sigma/\Sigma) = 0.5$, with the result that $\theta = 195°$.

From inspection of FIG. 3, it can be seen that the radial displacement $\rho$ of an event from the center of the crystal (i.e., the polar displacement of the event) is:

$$\rho = R \cot (\Omega_1/2)$$

where $R$ is the crystal radius and the angle $\Omega_1$ is as indicated in FIG. 3. Note that diametral line 106 passing through event $E_2$ is perpendicular to diametral line 105 which is the base of a triangle whose apex is the angle $\Omega_1$. Thus, the angle $\Omega_1$ is, to a first approximation, proportional to the light received by the six photomultipliers of Group (a) of Set IV (for event $E_2$). In general, the set whose value is required to compute the angle $\Omega_1$ is obtained by adding (or subtracting) the quantity "3" to the number of the set preceeding a set whose value changes sign. Having attained the argument of the trigonometric function, the quality $\rho/R$ can be calculated using a series expansion for the cotangent.

Figure 5:
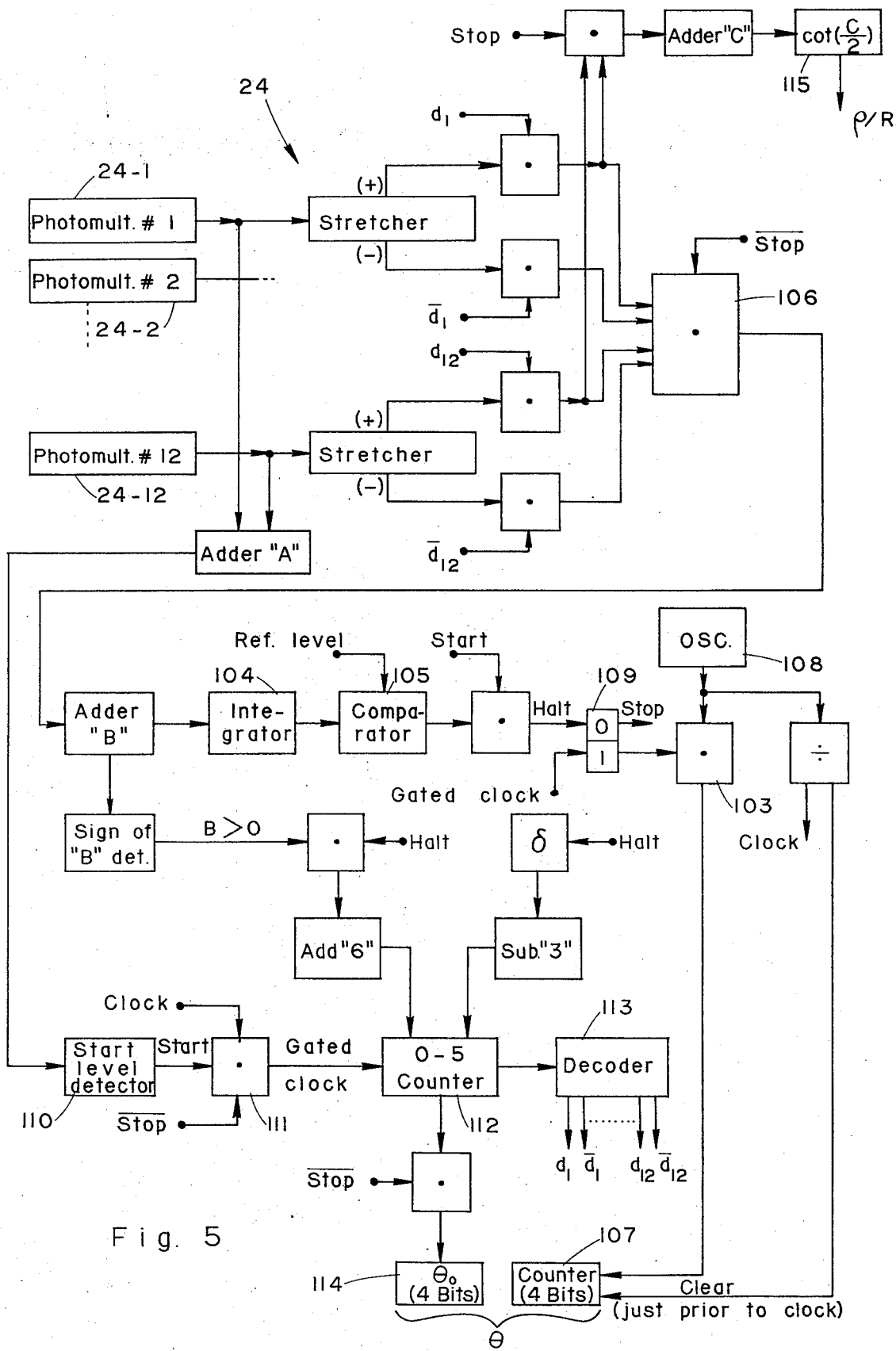
FIG. 5 is a circuit diagram for computing the polar coordinates of an event in the crystal from the output of the photo-detectors associated with the crystal.

FIG. 5 shows a simplified block diagram of apparatus 24 for carrying out the computation of the polar coordinates of an event using the theory described above. When an event occurs, light therefrom is detected by each of 12 photomultipliers 24-1 to 24-12, the outputs being summed in adder "A." Start level detector 110 samples the contents of adder "A" and produces a "start" level signal that opens gate 111 only when the energy received by the detectors lies within a preselected range. This arrangement ensures that the apparatus will not respond to spurious light inputs to the crystal.

When gate 111 opens, clock pulses with a period much shorter than the output of the pulse stretchers associated with each photomultiplier, are applied to molulo-6 counter 112 and to the set-side of control flip-flop 109. The clock, which is preferably at a frequency of about 5MHZ, is derived from stabilized oscillator 108 which develops a signal at preferably 50 MHZ. Six clock pulses are produced in about 1 $\mu$ sec which represents the minimum pulse stretching period for the output of the photomultipliers.

On receipt of the first clock pulse, counter 112 changes state from "4" to "5," and the gate 103 is opened by flip-flop 109 applying the oscillator signal to interpolation counter 107 which begins to accumulate pulses at a 50 MHZ rate. Decoder 113 decodes the contents of counter 112 producing the following outputs: d1, d2, d3, d4, d5, d6, $\bar{d}7$, $\bar{d}8$, $\bar{d}9$, $\bar{d}10$, $\bar{d}11$ and $\bar{d}12$. Thus, all of the outputs of the stretchers associated with photomultipliers 24 - 1 through 24 - 6 will be positive, while the outputs of the balance will be negative. Since gate 106 is open, adder "B" will contain the value of Set I upon the occurrence of the first clock pulse. If such value is different from zero (i.e., the event having occurred at a polar angle different from 0°), the gate 111 remains open and the next clock pulse causes the counter 112 to change state from "5" to "0." Just prior to the second clock pulse, counter 104 is cleared so that when the second clock pulse occurs, counter 107 again begins to accumulate pulses at a 50 MHZ rate.

The output of decoder 113 in state "2" is $\bar{d}1$, d2, d3, d4, d5, d6, d7, $\bar{d}8$, $\bar{d}9$, $\bar{d}10$, $\bar{d}11$ and $\bar{d}12$; and the contents of adder "B" changes to the value of Set II. This process continues until a zero-crossover of the integrated output of adder "B" is detected by comparator 105. The resultant trigger pulse resets the control flip-flop 109 disconnecting counter 107 from oscillator 108, and causes the quantity "6" to be added to counter 112 if the sign of the contents of adder "B" is positive. Thus, when a halt pulse occurs, counter 114 will contain the quantity $\theta_o$ as defined above, and counter 107 will contain the required interpolation.

The polar displacement $\rho$ is obtained by subtracting the quantity "3" from counter 112, the resultant output of decoder 113 serving to cause the value of the required Group (a) of a set to appear in adder "C," providing the argument for the series expansion calculation in block 115 whose output is $\rho/R$.

As an example, consider the occurrence of event $E_2$. Prior to the event, counter 112 contains "4" and counter 107 is cleared. When the event occurs, the first clock pulse changes the counter 112 to state "5" and counter 107 begins to accumulate pulses from the oscillator. At this stage, the sign of the contents of adder "B" is positive and the positive step function input to integration 104 provides an exponentially increasing output to comparator 105. Depending upon the time constant of integrator, the output will have a certain level when the next clock pulse occurs. The contents of adder "B" changes from a positive to a negative member as the value of Set II is calculated, and the negative step function applied to the integrator causes the output to decrease towards the negative level established by adder "B." When the reference level set in comparator 105 is reached, the resultant halt pulse freezes the contents of counters 114 and 107. Counter 114 will contain "0" and counter 107 will contain "$5_{10}$" if the event $E_2$ occurs at a polar angle of 15°. After a delay δ, the quantity "3" is subtracted from counter 112 which will then contain the number "3," since this is a modulo-6 counter. This will permit adder "C" to compute a good approximation of the angle $\Omega_1$ from which the quantity $\rho/R$ is computed.

If counter 114 is binary, four bits will be required to specify decimal numbers in the range "0" to "11" representing polar angles from 0° to 330°. If counter 107 is binary, four bits will be required to specify the decimal fraction, "0.0" to "0.9."

If event $E_3$ occurs, the sequence of events described above in connection with event $E_2$ repeat, except that after receipt of the second clock pulse, the sign of the content, of adder "B" will be positive and the "halt" trigger pulse will add "6" to the "0" in counter 112. Counter 114 will therefore contain "$6_{10}$" indicating that $\theta_o$ is 180° and counter 107 will contan "$5_{10}$" indicating that the interpolation is 15°.

Other apparatus for computing the polar coordinates can, of course, be used. Instead of using a combination of digital and analogue techniques as shown in FIG. 5, a completely digital or completely analogue computation can be employed.

What is claimed is:

1. A detector responsive to incident radiation stimuli comprising: a scintillator crystal responsive to an event therein caused by radiation stimulus for emitting a light pulse; the crystal being defined by a peripheral edge surface whose generatrix is parallel to the central axis of the crystal, and a pair of parallel polished and non-coated faces perpendicular to the axis; and a plurality of pairs of photo-detectors each of which has a photosensitive surface positioned adjacent different segments of the edge surface of the crystal for receiving light emitted by the crystal in response to an event, each photo detector of a pair being in diametrical alignment whereby the output of each photodetector is functionally dependent on the planar coordinates of the event relative to the central axis but is independent of the axial location of the event in the crystal.

2. A detector according to claim 1 wherein the edge surface of the crystal is contoured to mate with the light input face of the photo-detectors adjacent their respective sensitive surfaces.

3. A detector according to claim 2 wherein the input faces of the photo-detectors are cemented to the crystal.

4. A detector according to claim 1 in combination with a collimator positioned on one of the parallel faces of the crystal.

5. A detector according to claim 1 in combination with computing means responsive to the output of the photo-detector for computing the planar coordinates of an event.

6. A detector according to claim 1, wherein said computing means is effective to compute the polar coordinates of an event relative to the central axis of the crystal.

7. Apparatus according to claim 6 wherein said computing means includes a pulse stretcher for each photodetector for prolonging the duration of the output of the photo-detectors in response to a light pulse in the crystal, means for sequentially computing the value of different sets of two groups of photo-detectors by summing the outputs of the groups, and logic means responsive to the value of the sets for identifying either the set having zero value or the first of two consecutive sets whose values change in sign.

8. Apparatus according to claim 7 including additional logic means for identifying the sign of the next set following a set having zero value or the sign of the second of two consecutive sets whose value change in sign whereby the polar angle of an event is ascertained.

9. Apparatus according to claim 8 including an adder for summing the outputs of the photo-detectors, an integrator responsive to the contents of the adder for producing a control signal, and a comparator for determining the occurrence of a zero-crossover of the signal.

10. Apparatus according to claim 8 including means responsive to the output of a set of photo-detectors determined by the polar angle of an event for computing the radial displacement of the event.

* * * * *